United States Patent
Zhong

(10) Patent No.: US 11,365,762 B2
(45) Date of Patent: Jun. 21, 2022

(54) HIGH SPEED BEARING CAGE

(71) Applicant: Schaeffler Technologies AG & Co. KG, Herzogenaurach (DE)

(72) Inventor: Guihui Zhong, Charlotte, NC (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 0 days.

(21) Appl. No.: 17/098,897

(22) Filed: Nov. 16, 2020

(65) Prior Publication Data

US 2022/0154772 A1  May 19, 2022

(51) Int. Cl.
*F16C 33/46* (2006.01)

(52) U.S. Cl.
CPC ...... *F16C 33/4676* (2013.01); *F16C 33/4605* (2013.01); *F16C 33/4682* (2013.01)

(58) Field of Classification Search
CPC .............. F16C 33/4605; F16C 33/4611; F16C 33/4617; F16C 33/4623; F16C 33/4629; F16C 33/4635; F16C 33/4641; F16C 33/4647; F16C 33/4652; F16C 33/4664; F16C 33/467; F16C 33/4676; F16C 33/468

See application file for complete search history.

(56) References Cited

U.S. PATENT DOCUMENTS

| 3,298,761 A | 1/1967 | Schaeffler | |
| 10,145,416 B2 * | 12/2018 | Mahler | F16C 33/4676 |
| 2014/0254971 A1 * | 9/2014 | Shimizu | F16C 33/4629 384/572 |

FOREIGN PATENT DOCUMENTS

| DE | 102015212450 | * | 1/2017 |
| JP | 2001-41223 | * | 2/2001 |
| JP | 2012-52559 | * | 3/2012 |
| WO | WO2012/023437 | * | 2/2012 |

* cited by examiner

*Primary Examiner* — James Pilkington
(74) *Attorney, Agent, or Firm* — Volpe Koenig

(57) ABSTRACT

A bearing cage is disclosed that includes a first ring and a second ring with a plurality of crossbars extending therebetween to define a plurality of rolling element pockets. The first ring and the second ring each include a plurality of radially outward protrusions, a plurality of reliefs, and a plurality of axially extending protrusions extending into the plurality of rolling element pockets. The plurality of crossbars each include a plurality of retention tabs configured to engage rolling elements in the plurality of rolling element pockets.

18 Claims, 9 Drawing Sheets

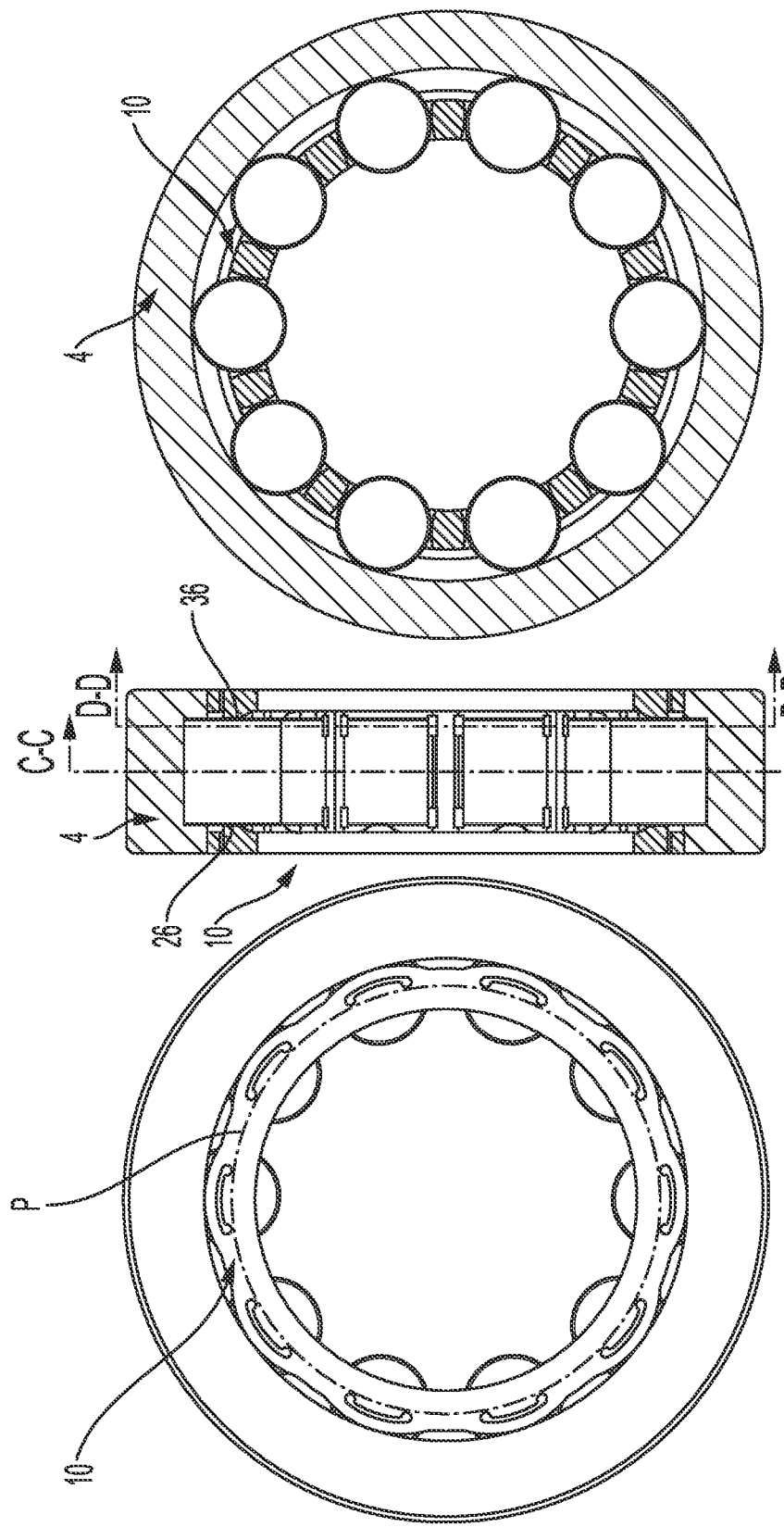

US 11,365,762 B2

HIGH SPEED BEARING CAGE

FIELD OF INVENTION

The present disclosure relates to a high speed bearing cage.

BACKGROUND

Bearing assemblies are used in a wide range of applications. In particular, electric vehicles rely on bearing assemblies that have high speed capabilities. As used herein, the term high speed with respect to bearing assemblies means speeds of 20,000 rpm to over 50,000 rpm. The cages used in these high speed bearing applications present a variety of challenges regarding durability and friction losses.

It would be desirable to provide a high speed bearing cage that can withstand high performance demands regarding durability and also reduce friction losses.

SUMMARY

A bearing cage is disclosed that includes a first ring and a second ring with a plurality of crossbars extending therebetween to define a plurality of rolling element pockets. The first ring and the second ring each include a plurality of radially outward protrusions, a plurality of reliefs, and a plurality of axially extending protrusions extending into the plurality of rolling element pockets. The plurality of crossbars each include a plurality of retention tabs configured to engage rolling elements in the plurality of rolling element pockets.

In one aspect, the plurality of reliefs each have a profile including a first round end, a second round end, and an elongated slot connecting the first round end and the second round end. The first round end and the second round end extend radially inward from the elongated slot. The reliefs can have a telephone-shaped profile.

The plurality of retention tabs can be formed via a plurality of fingers and a plurality of slots. The plurality of slots in the plurality of crossbars are oriented in a radially outward direction, and a radial extent of the plurality of slots is at least 50% of a total radial extent of the plurality of crossbars.

In one aspect, the plurality of radially outward protrusions are circumferentially aligned and overlapping with the plurality of rolling element pockets.

The plurality of retention tabs can be only provided in regions directly adjacent to a respective one of the first ring and the second ring.

The plurality of reliefs are positioned radially outward from a pitch diameter in one aspect.

The bearing cage can be formed from a high heat polyamide or a thermoplastic polymer. In one embodiment, the bearing cage has a thickness greater than 0.5 mm throughout each of the components of the bearing cage.

Circumferential areas defined between the plurality of radially outward protrusions can be configured to define lubrication channels to the rolling elements held within the bearing cage.

A bearing assembly is also disclosed herein.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 12 is a front view of the bearing assembly of FIGS. 9-11 in an assembled state.

FIG. 13 is a side cross-sectional view of the bearing assembly of FIGS. 9-12.

FIG. 14 is a cross-sectional view of the bearing assembly of FIG. 13 along line C-C.

DETAILED DESCRIPTION OF THE PREFERRED EMBODIMENTS

Figure 2:
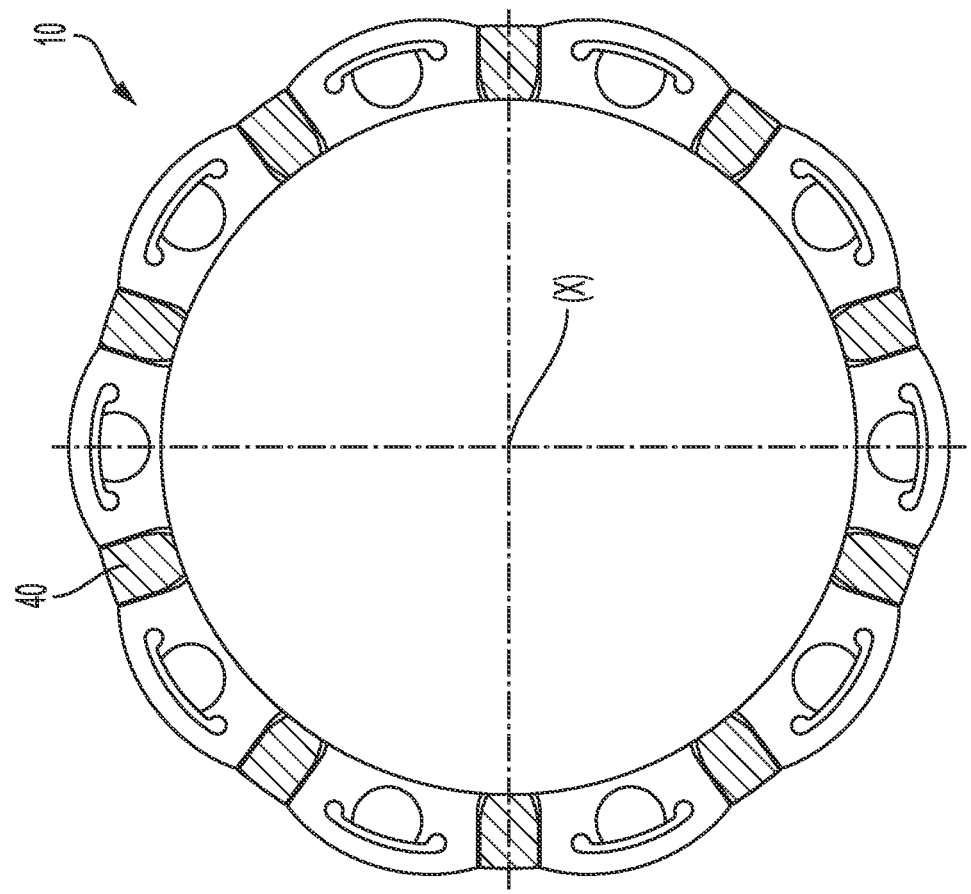
FIG. 2 is a front cross-sectional view of the bearing cage of FIG. 1 along line A-A.
Figure 1:
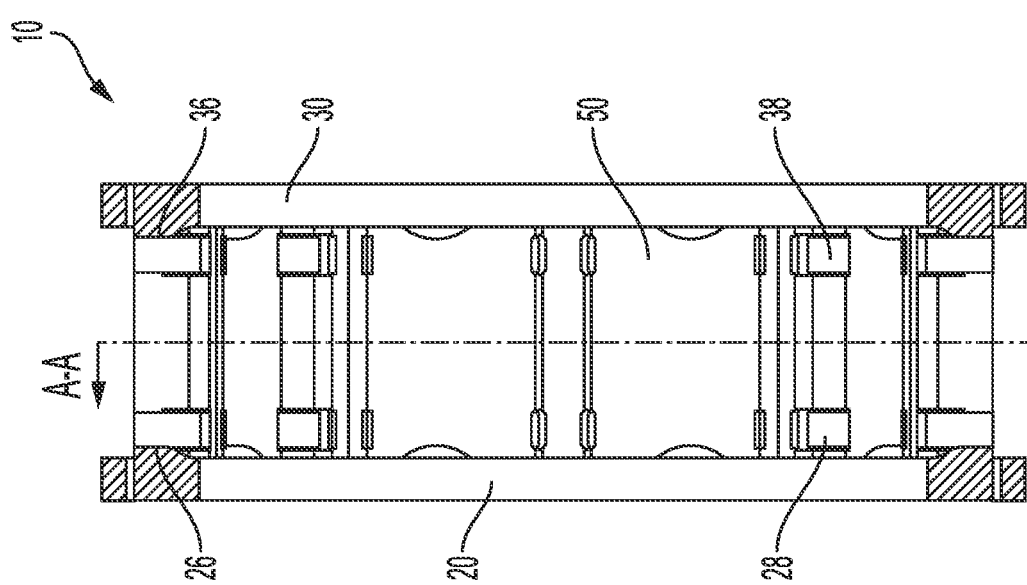
FIG. 1 is a side cross-sectional view of a bearing cage according to one aspect.
Figure 3:
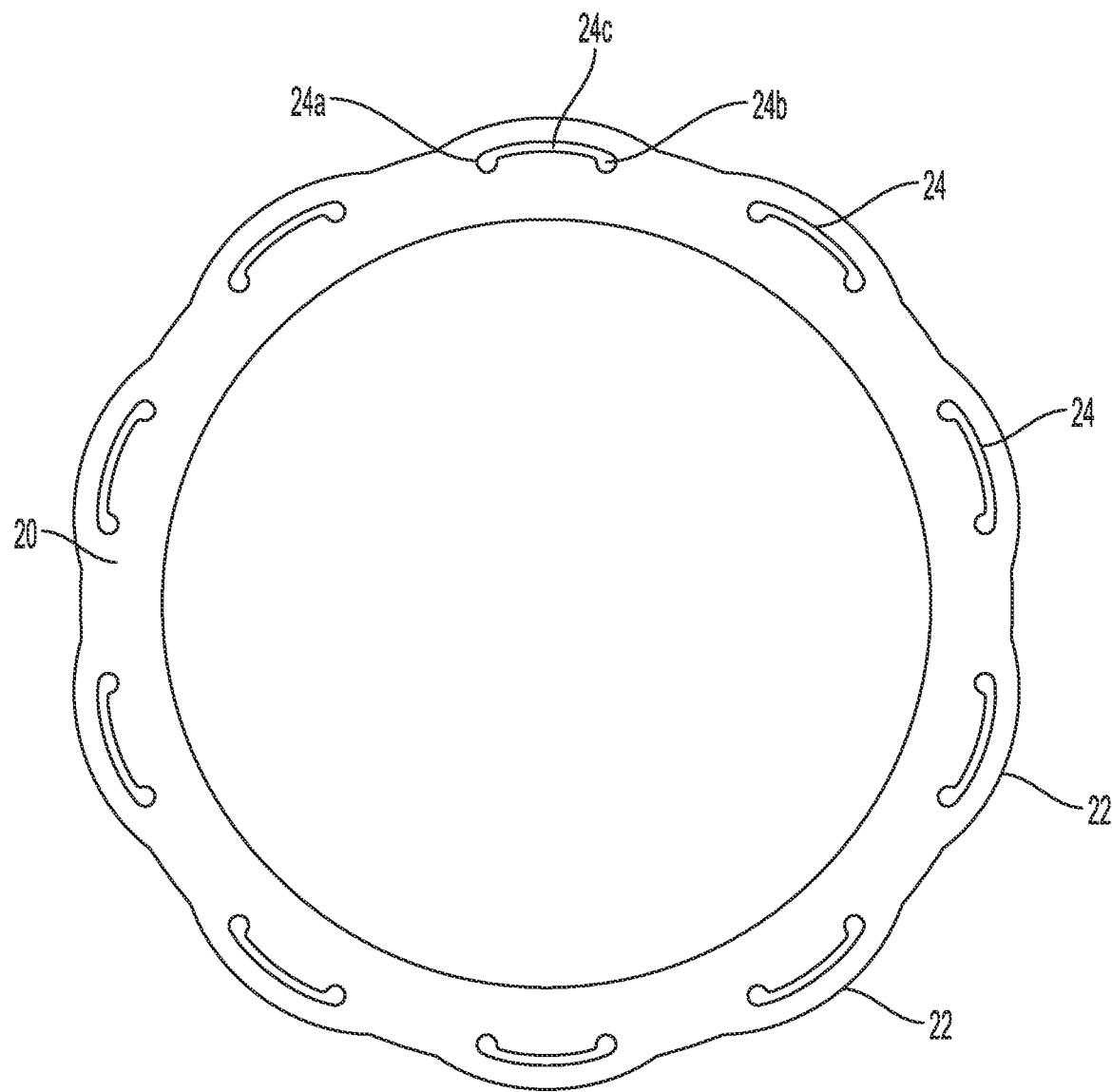
FIG. 3 is a front planar view of the bearing cage of FIGS. 1 and 2.
Figure 4:
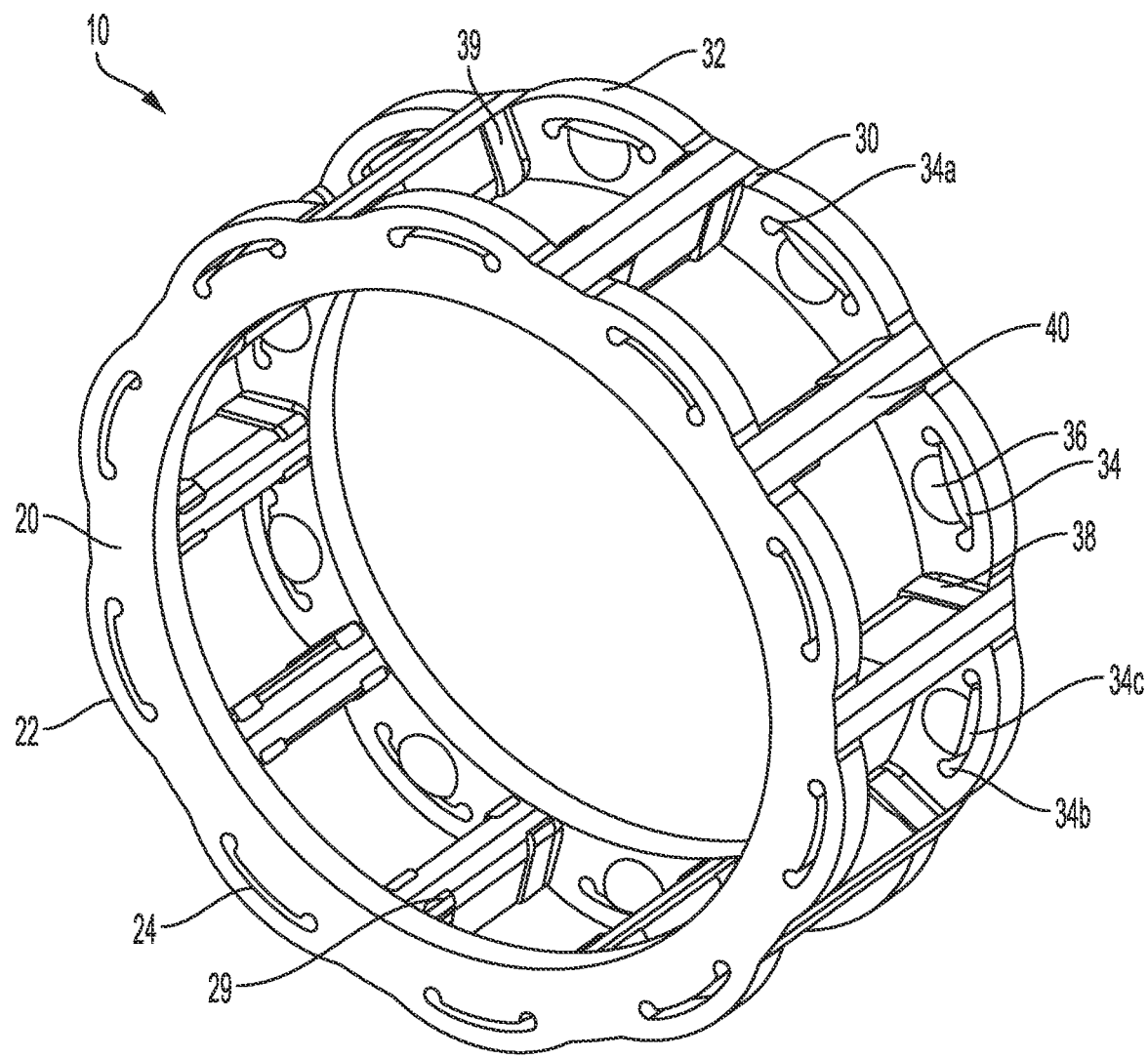
FIG. 4 is a perspective view of the bearing cage of FIGS. 1-3.
Figure 6:
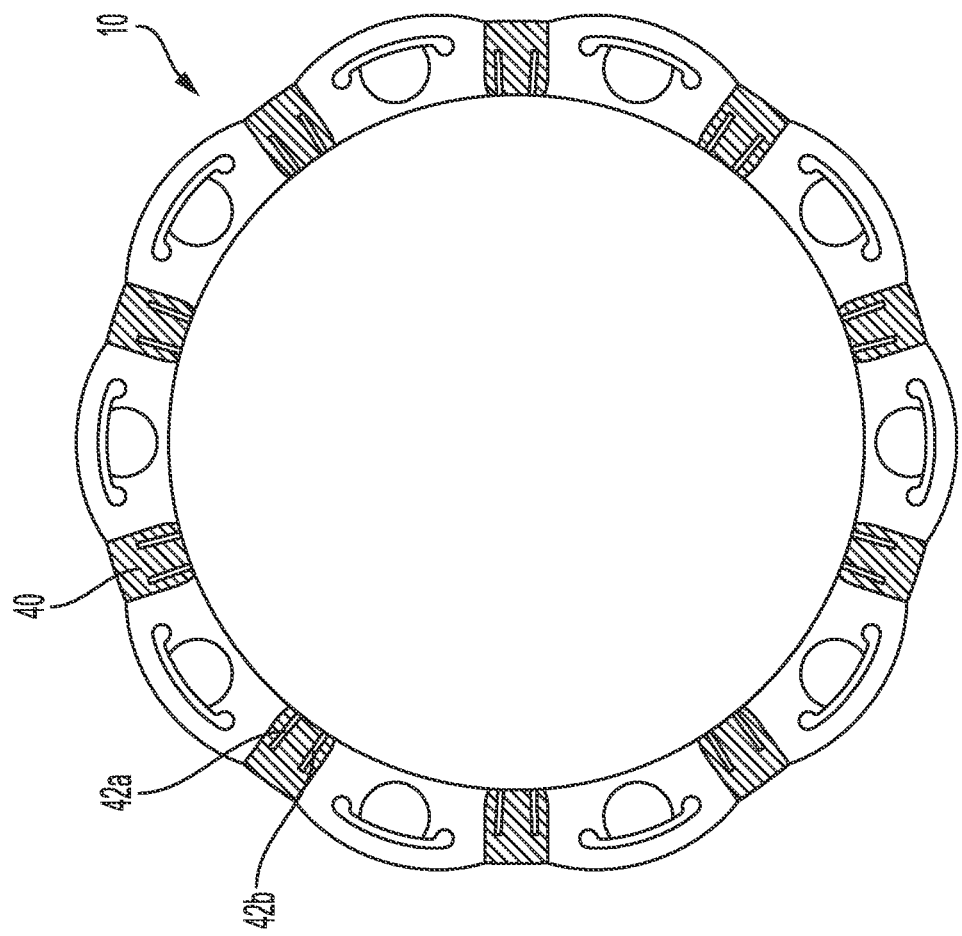
FIG. 6 is a front cross-sectional view of the bearing cage of FIG. 5 along line B-B.
Figure 5:
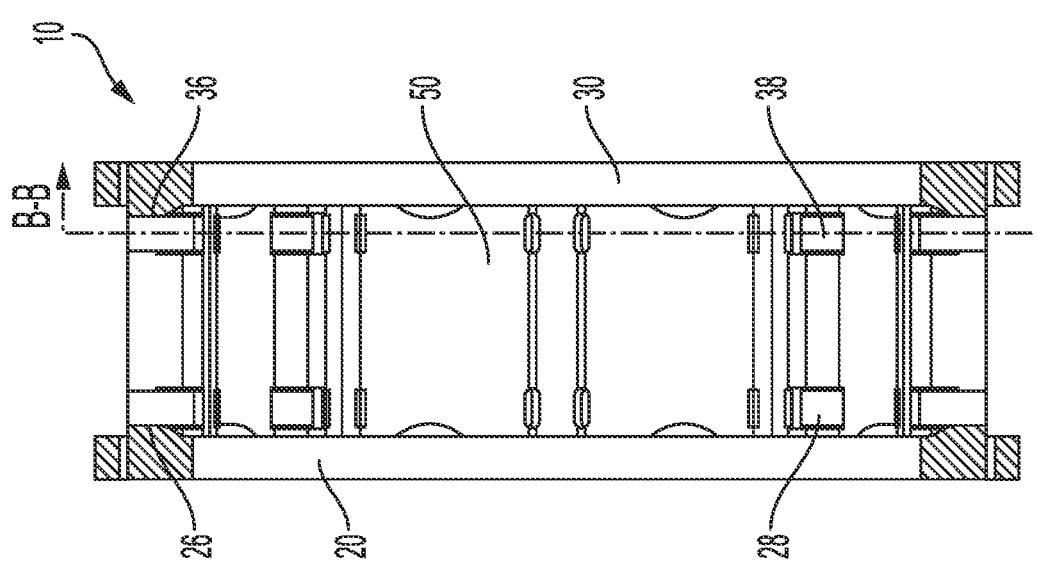
FIG. 5 is another cross-sectional view of the bearing cage of FIGS. 1-3.
Figure 8:
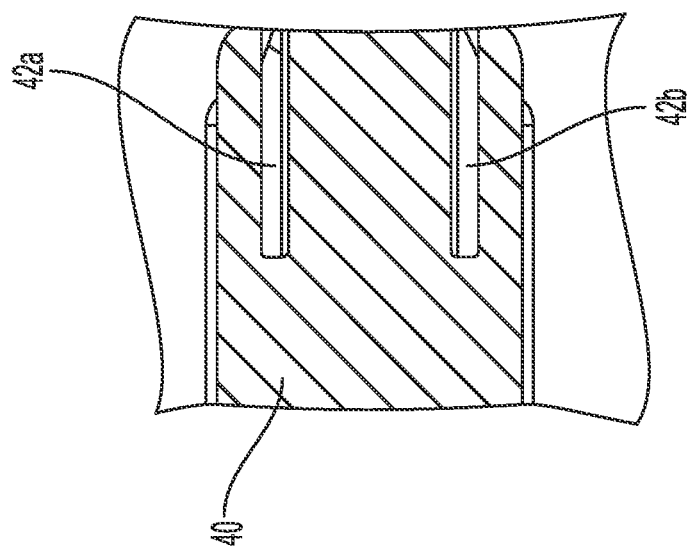
FIG. 8 is a magnified view of a crossbar of the bearing cage of FIGS. 1-8.

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A bearing cage 10 is illustrated in FIGS. 1-15. The bearing cage 10 includes a first ring 20 and a second ring 30 with a plurality of crossbars 40 extending therebetween to define a plurality of rolling element pockets 50.

The first ring 20 and the second ring 30 each include various features. In one aspect, the first ring 20 and the second ring 30 are identical to each other. One of ordinary skill in the art would understand that the first ring 20 and the second ring 30 can be different from each other.

In one embodiment, the first ring 20 and the second ring 30 each include a plurality of radially outward protrusions 22, 32, a plurality of reliefs 24, 34, and a plurality of axially extending protrusions 26, 36 extending into the plurality of rolling element pockets 50.

The term relief is used herein to refer to a hole, opening, gap, or other lack of material in rings 20, 30.

The plurality of crossbars 40 each include a plurality of retention tabs 28, 38 configured to engage with rolling elements 6. The plurality of retention tabs 28, 38 are each formed via a plurality of fingers 29, 39 and a plurality of slots 42a, 42b (i.e. cutouts) such that the plurality of fingers 29, 39 provide a circumferentially extending portion to secure the rolling elements 6. In one embodiment, the plurality of retention tabs 28, 38 are only provided in regions directly adjacent to a respective one of the first ring 20 and the second ring 30. In other words, the crossbars 40 do not include retention tabs 28, 38 along an entire axial extent of the crossbars 40. This design ensures that the rolling elements 6 do not contact the crossbars 40 in medial regions of the crossbars 40. In one aspect, the crossbars 40 are flat and uniform between the retention tabs 28, 38.

Figure 7:
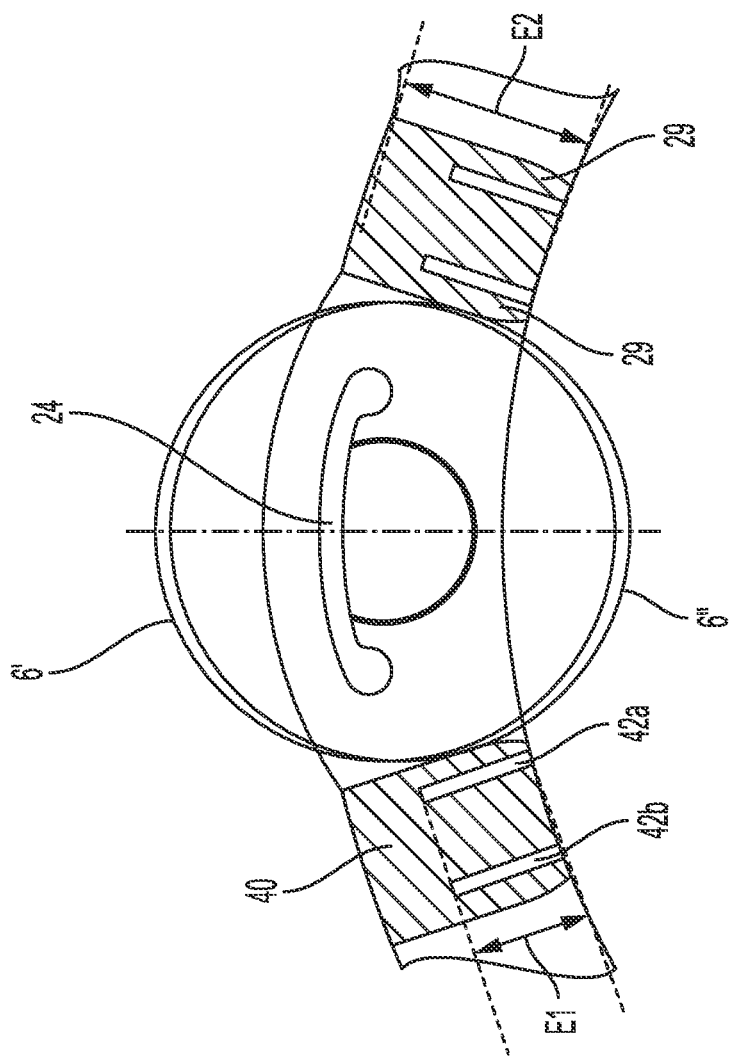
FIG. 7 is a magnified view of a pocket of the bearing cage of FIGS. 1-6.
Figure 9:
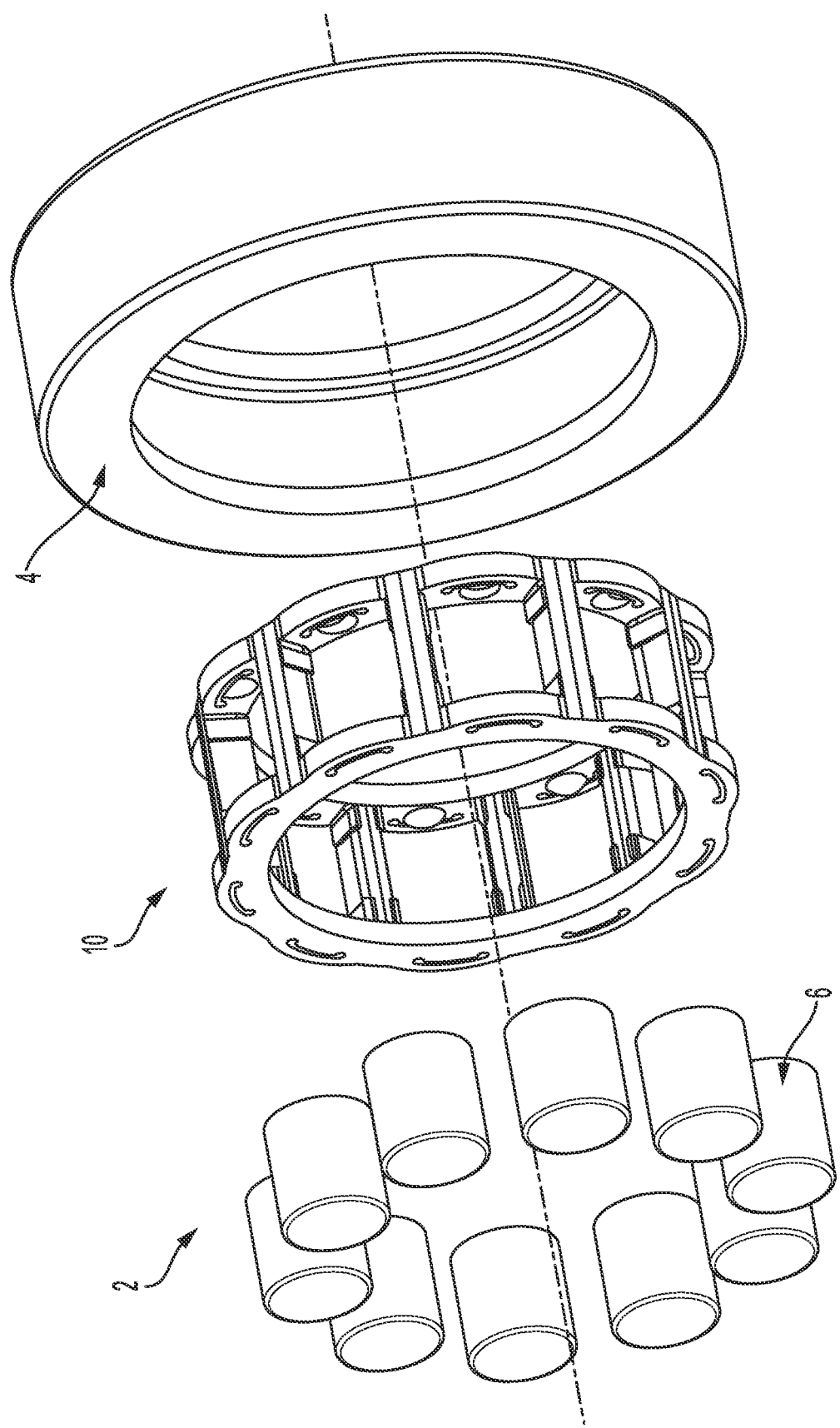
FIG. 9 is an exploded view of a bearing assembly including the bearing cage of FIGS. 1-8.
Figure 11:
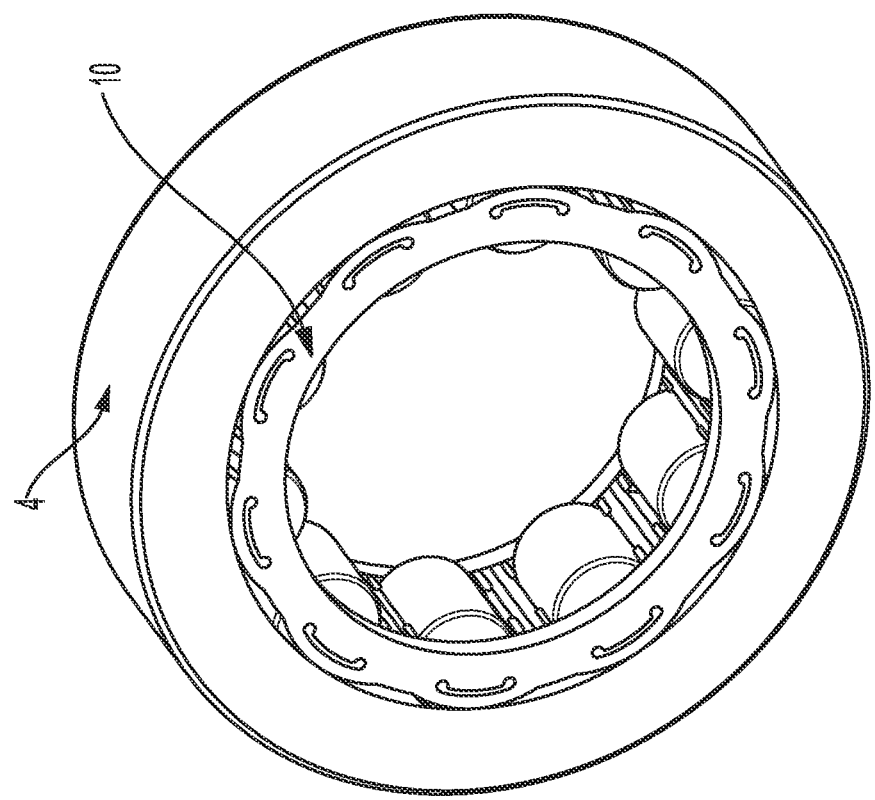
FIG. 11 is a perspective view of the bearing assembly of FIGS. 9 and 10.
Figure 15:
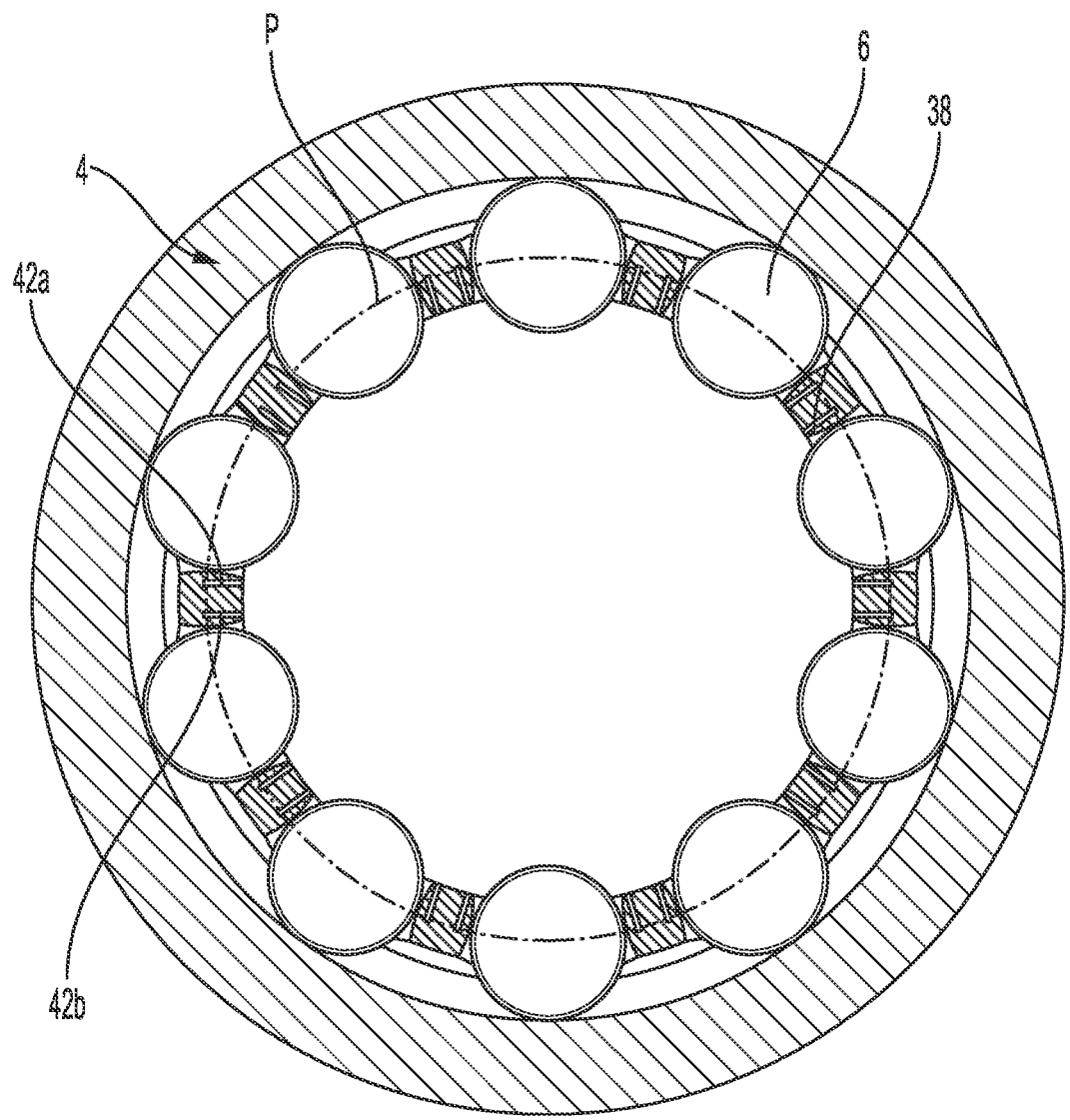
FIG. 15 is another cross-sectional view of the bearing assembly of FIG. 13 along line D-D.

The retention tabs 28, 38 reduce the impact effect and high stress at corners of the rolling element pockets 50. The fingers 29, 39 and slots 42a, 42b also provide a degree of flexibility to absorb shocks from heavy roller impact during high speeds. FIG. 15 is provided to specifically show the interface between the retention tabs 28, 38 and the rolling elements 6. This design also allows for a smaller clearance between the rolling elements 6 and the retention tabs 28, 38, and helps control a tighter or more limited rolling element drop limit. As shown in FIG. 7, the rolling element drop is a distance between 6' and 6". The arrangement disclosed herein provides retention tabs 28, 38 such that the rolling elements can be load in with an interference that is greater than 0.01 mm, or greater than 0.1 mm in one embodiment. This configuration reduces the rolling element drop and makes the bearing assembly more stable.

The plurality of slots 42a, 42b in the plurality of crossbars 40 are oriented in a radially outward direction. The plurality of slots 42a, 42b extend from a radially inner surface of the crossbars 40 in the radially outward direction. In one aspect, the slots 42a, 42b are identical to each other.

A radial extent (E1) or depth of the plurality of slots 42a, 42b is at least 50% of a total radial extent (E2) or depth of the plurality of crossbars 40. One of ordinary skill in the art would understand that the depth of the slots 42a, 42b can vary.

In one embodiment, the plurality of reliefs 24, 34 each have a profile including a first round end 24a, 34a, a second round end 24b, 34b, and an elongated slot 24c, 34c connecting the first round end 24a and the second round end 24b. In one aspect, the first round end 24a, 34a and the second round end 24b, 34b extend radially inward from the elongated slot 24c, 34c. In one embodiment, each of the reliefs 24, 34 extend for at least 10 degrees in a circumferential direction. In one aspect, the reliefs 24, 34 have a "telephone-shaped" profile, i.e. a generally curved body with enlarged ends oriented in the same direction. The reliefs 24, 34 reduce the impact effect between the bearing cage 10 and the cage guidance (i.e. the outer ring 4 or an outer housing), which helps damp vibrations of the bearing cage 10 and makes the bearing cage more dynamically stable. This design helps reduce cage friction losses during high speeds.

The plurality of axially extending protrusions 26, 36 each are formed as circular bumps or protrusions. The axially extending protrusions 26, 36 establish a single point of contact between the rolling elements and the ends of the rolling element pockets 50. This design helps reduce friction losses. In other words, this design helps reduce the overall size of contact surfaces between the rolling elements 6 and the bearing cage 10.

In one embodiment, the plurality of radially outward protrusions 22, 32 are circumferentially aligned or overlap with the plurality of rolling element pockets 50. One of ordinary skill in the art would understand from the present disclosure that the location of the protrusions 22, 32 can vary. The protrusions 22, 32 generally help reduce a contact area of the bearing cage 10 with an outer component. This also helps reduce friction losses due to the reduction in contact area and thus reduces friction. Spaces defined circumferentially between the radially outward protrusions 22, 32 also act as channels 43 for improving lubrication flow, which improves durability and the life cycle for the bearing cage 10. In the assembled state, the protrusions 22, 32 define points of contact between the bearing cage 10 and the outer ring 4.

The bearing cage 10 disclosed herein can be formed from any suitable material. In one aspect, the bearing cage 10 is formed from a high heat polyamide or a thermoplastic polymer. In one embodiment, the bearing cage 10 is formed from PA46-GF30, PA66-GF30 or polyether ether ketone (PEEK).

In one aspect, the bearing cage 10 maintains a thickness of each of the components described herein of 1.0 mm or thicker. In one aspect, each of the bearing cage components have a thickness greater than 0.5 mm.

The bearing cage 10 disclosed herein can be implemented in any bearing application and is particularly well suited for high speed bearing applications. For example, the bearing cage 10 can be used in an electric motor axle. The bearing cage 10 is suitable for operation in bearing applications having speeds of 20,000 rpm to over 50,000 rpm.

Figure 10:
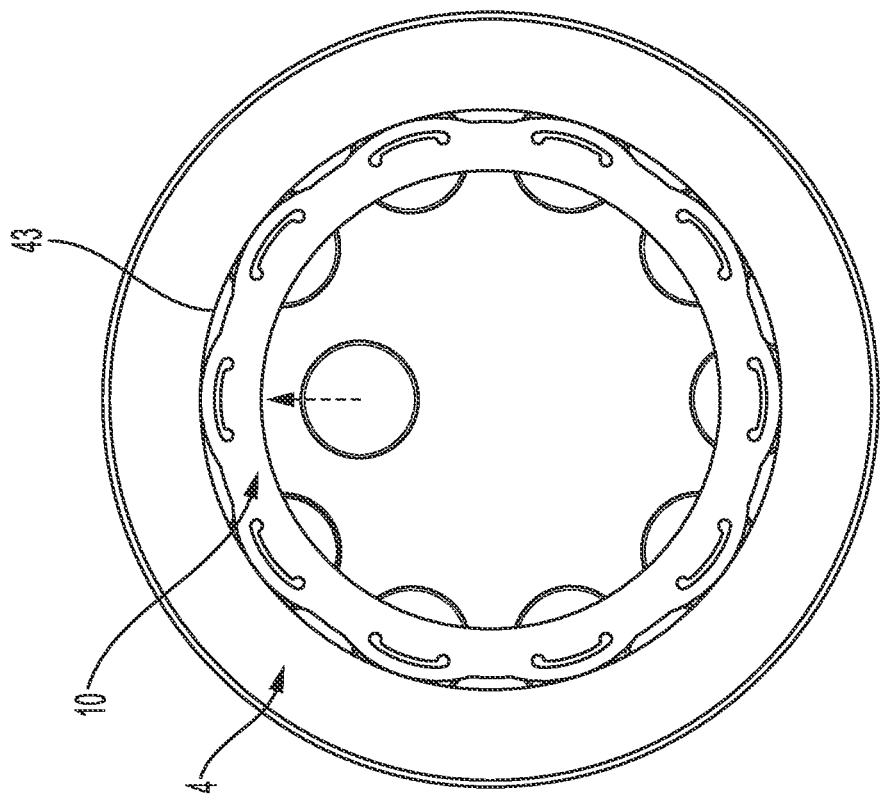
FIG. 10 is a front view of the bearing assembly of FIG. 9 in a partially assembled state.

FIGS. 9-15 illustrate various views of a bearing assembly 2 that includes the bearing cage 10, as well as the rolling elements 6 and the outer ring 4. During assembly, as shown in FIG. 10, the rolling elements 6 can be inserted in a radially outward direction to snap into the rolling element pockets 50 defined by the bearing cage 10. As shown in FIG. 12, the reliefs 24, 34 are arranged radially outward from the pitch diameter (P) of the bearing assembly 2. One of ordinary skill in the art would understand that the position of the reliefs 24, 34 can vary. As shown in FIG. 15, the slots 42a, 42b extend radially outward at least to a pitch diameter (P) of the bearing assembly.

FIG. 7 illustrates two relative positions of the rolling elements 6. As shown in FIG. 7, position 6' of the rolling elements 6 corresponds to a running position. In other words, position 6' illustrates the rolling elements 6 being relatively radially outward to a resting position due to centrifugal force. Position 6" corresponds to a drop limit position for the rolling elements 6. These positions are controlled by the degree of flexibility in the retention tabs 28, 38, which is a result of the fingers 29, 39 and slots 42a, 42b. Based on the configuration of the bearing cage and flexible fingers 29, 39, the drop of the rolling element (i.e. distance between 6' and 6") is limited to 0.3 mm.

Having thus described the present disclosure in detail, it is to be appreciated and will be apparent to those skilled in the art that many physical changes, only a few of which are exemplified in the detailed description of the embodiments, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS bearing assembly 2
outer ring 4
rolling elements 6
bearing cage 10
first ring 20
radially outward protrusions 22
reliefs 24
first round end 24a
second round end 24b
elongated slot 24c
axially extending protrusions 26
retention tabs 28
fingers 29
second ring 30
radially outward protrusions 32
reliefs 34
first round end 34a
second round end 34b
elongated slot 34c
axially extending protrusions 36
retention tabs 38
fingers 39
crossbars 40
slots 42a, 42b
channels 43
rolling element pockets 50

What is claimed is:

1. A bearing cage comprising:
a first ring and a second ring with a plurality of crossbars extending therebetween to define a plurality of rolling element pockets,
the first ring and the second ring each including:
a plurality of radially outward protrusions,
a plurality of reliefs; and
a plurality of axially extending protrusions extending into the plurality of rolling element pockets,
wherein the plurality of radially outward protrusions, the plurality of reliefs, and the plurality of axially extending protrusions each at least partially overlap with each other in a radial direction; and
the plurality of crossbars each including:
a plurality of retention tabs configured to engage rolling elements in the plurality of rolling element pockets.

2. The bearing cage of claim 1, wherein the plurality of reliefs each have a profile including a first round end, a second round end, and an elongated slot connecting the first round end and the second round end.

3. The bearing cage of claim 2, wherein the first round end and the second round end each extend radially inward from the elongated slot.

4. The bearing cage of claim 1, wherein the plurality of retention tabs are formed via a plurality of fingers and a plurality of slots.

5. The bearing cage of claim 4, wherein the plurality of slots in the plurality of crossbars are oriented in a radially outward direction.

6. The bearing cage of claim 5, wherein an extent of the plurality of slots is at least 50% of a total extent of the plurality of crossbars.

7. The bearing cage of claim 1, wherein the plurality of radially outward protrusions are circumferentially aligned and overlapping with the plurality of rolling element pockets.

8. The bearing cage of claim 1, wherein the plurality of retention tabs are only provided in regions directly adjacent to a respective one of the first ring and the second ring.

9. The bearing cage of claim 1, wherein the plurality of reliefs are positioned radially outward from a pitch diameter.

10. The bearing cage of claim 1, wherein the bearing cage is formed from a polyamide or a thermoplastic polymer.

11. The bearing cage of claim 1, wherein the bearing cage has a thickness greater than 0.5 mm.

12. A bearing cage comprising:
a first ring and a second ring with a plurality of crossbars extending therebetween to define a plurality of rolling element pockets,
the first ring and the second ring each including:
a plurality of radially outward protrusions, wherein circumferential areas defined between the plurality of radially outward protrusions are configured to define lubrication channels,
a plurality of reliefs; and
a plurality of axially extending protrusions extending into the plurality of rolling element pockets; and
the plurality of crossbars each including:
a plurality of retention tabs configured to engage rolling elements in the plurality of rolling element pockets.

13. A bearing assembly comprising:
(i) a bearing cage including:
a first ring and a second ring with a plurality of crossbars extending therebetween to define a plurality of rolling element pockets,
the first ring and the second ring each including:
a plurality of radially outward protrusions,
a plurality of reliefs; and
a plurality of axially extending protrusions extending into the plurality of rolling element pockets,
wherein the plurality of radially outward protrusions, the plurality of reliefs, and the plurality of axially extending protrusions each at least partially overlap with each other in a radial direction; and
the plurality of crossbars each including:
a plurality of retention tabs configured to engage rolling elements in the plurality of rolling element pockets; and
(ii) a plurality of rolling elements arranged in the plurality of rolling element pockets.

14. The bearing assembly of claim 13, further comprising circumferential areas defined between the plurality of radially outward protrusions which are configured to define lubrication channels that are open in an axial direction.

15. The bearing assembly of claim 13, wherein the plurality of retention tabs are formed via a plurality of fingers and a plurality of slots, and the plurality of slots extend radially outward at least to a pitch diameter (P) of the bearing assembly.

16. The bearing assembly of claim 13, wherein the plurality of rolling elements are each engaged in an axial direction by a single contact point on each axial end via the plurality of axially extending protrusions.

17. The bearing assembly of claim 13, wherein the plurality of rolling elements are cylindrical rollers.

18. The bearing assembly of claim 13, wherein the plurality of reliefs each have a profile including a first round end, a second round end, and an elongated slot connecting the first round end and the second round end, and the first round end and the second round end extend radially inward from the elongated slot, and the plurality of retention tabs are formed via a plurality of fingers and a plurality of slots.

\* \* \* \* \*